(12) United States Patent
Jikuhara et al.

(10) Patent No.: US 11,953,906 B2
(45) Date of Patent: Apr. 9, 2024

(54) INFORMATION PROCESSING DEVICE, METHOD, AND NON-TRANSITORY STORAGE MEDIUM

(71) Applicant: TOYOTA JIDOSHA KABUSHIKI KAISHA, Toyota (JP)

(72) Inventors: Yoshikazu Jikuhara, Miyoshi (JP); Shin Sakurada, Toyota (JP); Tomokazu Maya, Nagoya (JP); Hiroyuki Bandai, Toyota (JP); Hiromitsu Fujii, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/065,684

(22) Filed: Dec. 14, 2022

(65) Prior Publication Data
US 2023/0280750 A1  Sep. 7, 2023

(30) Foreign Application Priority Data
Mar. 3, 2022  (JP) ................................ 2022-033013

(51) Int. Cl.
*G05D 1/00*  (2006.01)

(52) U.S. Cl.
CPC ......... *G05D 1/0212* (2013.01); *G05D 1/0088* (2013.01)

(58) Field of Classification Search
CPC ................................................... G05D 1/0212
See application file for complete search history.

(56) References Cited

U.S. PATENT DOCUMENTS

| 9,505,554 B1* | 11/2016 | Kong ..................... G06V 10/25 |
| 2019/0220811 A1* | 7/2019 | Naito .................. G05D 1/0088 |

FOREIGN PATENT DOCUMENTS

| JP | 2018162162 A | 10/2018 | |
| KR | 1020140051557 A | 5/2014 | |
| WO | WO-2019055281 A2 * | 3/2019 | ........... G01C 21/206 |

* cited by examiner

*Primary Examiner* — Vivek D Koppikar
*Assistant Examiner* — Paul W Arellano
(74) *Attorney, Agent, or Firm* — Dickinson Wright, PLLC

(57) ABSTRACT

An information processing device includes a controller configured to acquire information indicating an attribute of a recipient of a package, acquire information indicating a location for placing the package in a vehicle, and present a depositor of the package with the information indicating the location for placing the package and the information indicating the attribute of the recipient.

14 Claims, 4 Drawing Sheets

INFORMATION PROCESSING DEVICE, METHOD, AND NON-TRANSITORY STORAGE MEDIUM

CROSS-REFERENCE TO RELATED APPLICATION

This application claims priority to Japanese Patent Application No. 2022-033013 filed on Mar. 3, 2022, incorporated herein by reference in its entirety.

BACKGROUND

1. Technical Field

The present disclosure relates to an information processing device, a method, and a non-transitory storage medium.

2. Description of Related Art

A technique related to delivery of a package using a vehicle is known. Japanese Unexamined Patent Application Publication No. 2018-162162 (JP 2018-162162 A) discloses a technique for deciding an orientation of a package unloading position suitable for a package receiving location when a package is delivered using an unmanned autonomous vehicle.

SUMMARY

There is room for improvement in technique related to delivery of a package using a vehicle.

The present disclosure provides an information processing device, a method, and a non-transitory storage medium that improve the technique related to delivery of a package using a vehicle.

A first aspect of the present disclosure relates to an information processing device including a controller. The controller is configured to: acquire information indicating an attribute of a recipient of a package; acquire information indicating a location for placing the package in a vehicle; and present a depositor of the package with the information indicating the location for placing the package and the information indicating the attribute of the recipient.

In the first aspect of the present disclosure, the controller may be configured to decide the location for placing the package based on the attribute of the recipient.

In the first aspect of the present disclosure, the attribute of the recipient may include a height or an arm length of the recipient.

In the first aspect of the present disclosure, the controller may be configured to present the recipient with the information indicating the location for placing the package.

In the first aspect of the present disclosure, the controller may be configured to execute processing for performing the presentation by a voice or an image.

In the first aspect of the present disclosure, the vehicle may be configured to perform autonomous traveling.

In the first aspect of the present disclosure, the vehicle may be configured to autonomously travel between production lines provided in a facility, and the package may include a returnable box accommodating a part used in the facility.

A second aspect of the present disclosure relates to a method executed by an information processing device. The method includes: acquiring information indicating an attribute of a recipient of a package; acquiring information indicating a location for placing the package in a vehicle; and presenting a depositor of the package with the information indicating the location for placing the package and the information indicating the attribute of the recipient.

In the second aspect of the present disclosure, the method may further include deciding the location for placing the package based on the attribute of the recipient.

In the second aspect of the present disclosure, the attribute of the recipient may include a height or an arm length of the recipient.

In the second aspect of the present disclosure, the method may further include presenting the recipient with the information indicating the location for placing the package.

In the second aspect of the present disclosure, the method may further include executing processing for performing the presenting by a voice or an image.

In the second aspect of the present disclosure, the vehicle may be configured to perform autonomous traveling.

In the second aspect of the present disclosure, the vehicle may be configured to autonomously travel between production lines provided in a facility, and the package may include a returnable box accommodating a part used in the facility.

A third aspect of the present disclosure relates to a non-transitory storage medium storing instructions that are executable by a computer and that cause the computer to perform the following functions. The functions include: acquiring information indicating an attribute of a recipient of a package; acquiring information indicating a location for placing the package in a vehicle; and presenting a depositor of the package with the information indicating the location for placing the package and the information indicating the attribute of the recipient.

In the third aspect of the present disclosure, the functions may further include deciding the location for placing the package based on the attribute of the recipient.

In the third aspect of the present disclosure, the attribute of the recipient may include a height or an arm length of the recipient.

In the third aspect of the present disclosure, the functions may further include presenting the recipient with the information indicating the location for placing the package.

In the third aspect of the present disclosure, the functions may further include executing processing for performing the presenting by a voice or an image.

In the third aspect of the present disclosure, the vehicle may be configured to perform autonomous traveling.

According to aspects of the present disclosure, it is possible to improve a technique related to deliver of a package using a vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment of the present disclosure will be described.

Figure 1:
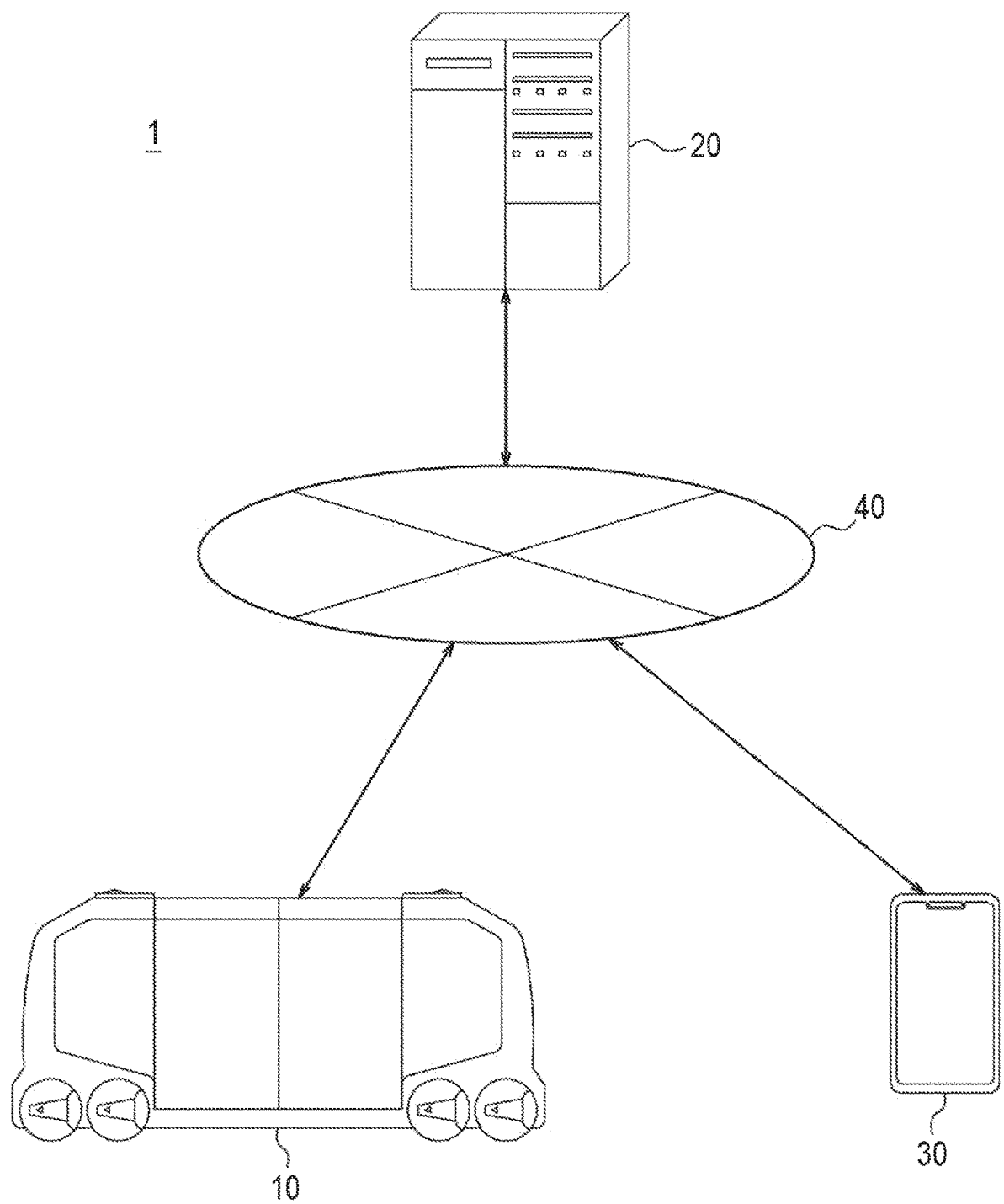
FIG. 1 is a block diagram showing a schematic configuration of a system according to an embodiment of the present disclosure.

An outline of a system 1 according to the embodiment of the present disclosure will be described with reference to FIG. 1.

The system 1 includes a vehicle 10, an information processing device 20, and a terminal device 30. The vehicle 10, the information processing device 20, and the terminal device 30 are communicatively connected to a network 40.

The vehicle 10 is, for example, an automobile, but the vehicle 10 is not limited thereto and may be any vehicle. The automobile is, for example, a gasoline-powered vehicle, a battery electric vehicle (BEV), a hybrid electric vehicle (HEV), a plug-in hybrid electric vehicle (PHEV), or a fuel cell electric vehicle (FCEV), but is not limited thereto. The vehicle 10 may be driven by a driver, or driving of the vehicle 10 may be automated at any level. The level of automation is, for example, one of Level 1 to Level 5 as specified by society of automotive engineers (SAE). The vehicle 10 may be a dedicated vehicle for a mobility-as-a-service (MaaS). Although one vehicle 10 is illustrated in FIG. 1, the number of the vehicles 10 provided in the system 1 can be optionally determined.

The information processing device 20 is a computer, such as a server belonging to a cloud computing system or other computing systems.

The terminal device 30 is a mobile device, such as a mobile phone, a smart phone, or a tablet. Although one terminal device 30 is illustrated in FIG. 1, the number of the terminal devices 30 provided in the system 1 can be optionally determined.

The network 40 includes the Internet, at least one wide area network (WAN), at least one metropolitan area network (MAN), or any combination thereof. The network 40 may include at least one wireless network, at least one optical network, or any combination thereof. The wireless network is, for example, an ad-hoc network, a cellular network, a wireless local area network (LAN), a satellite communication network or a terrestrial microwave network.

An outline of the present embodiment will be described with reference to FIG. 1.

A controller 21 of the information processing device 20 acquires information indicating an attribute of a recipient of a package. The controller 21 of the information processing device 20 acquires information indicating a location for placing the package in the vehicle 10. The controller 21 of the information processing device 20 presents a depositor of the package with the information indicating the location for placing the package and the information indicating the attribute of the recipient.

Even when the system designates the location for placing the package in the vehicle 10 in consideration of the recipient of the package, the depositor who loads the package into the vehicle 10 may mistake the location for placing the package. Meanwhile, according to the present embodiment, the attribute of the recipient is also presented to the depositor. Therefore, the depositor can easily assume the recipient and can suppress the mistake of the location for placing the package. Therefore, a technique related to deliver of a package using the vehicle 10 is improved.

Figure 2:
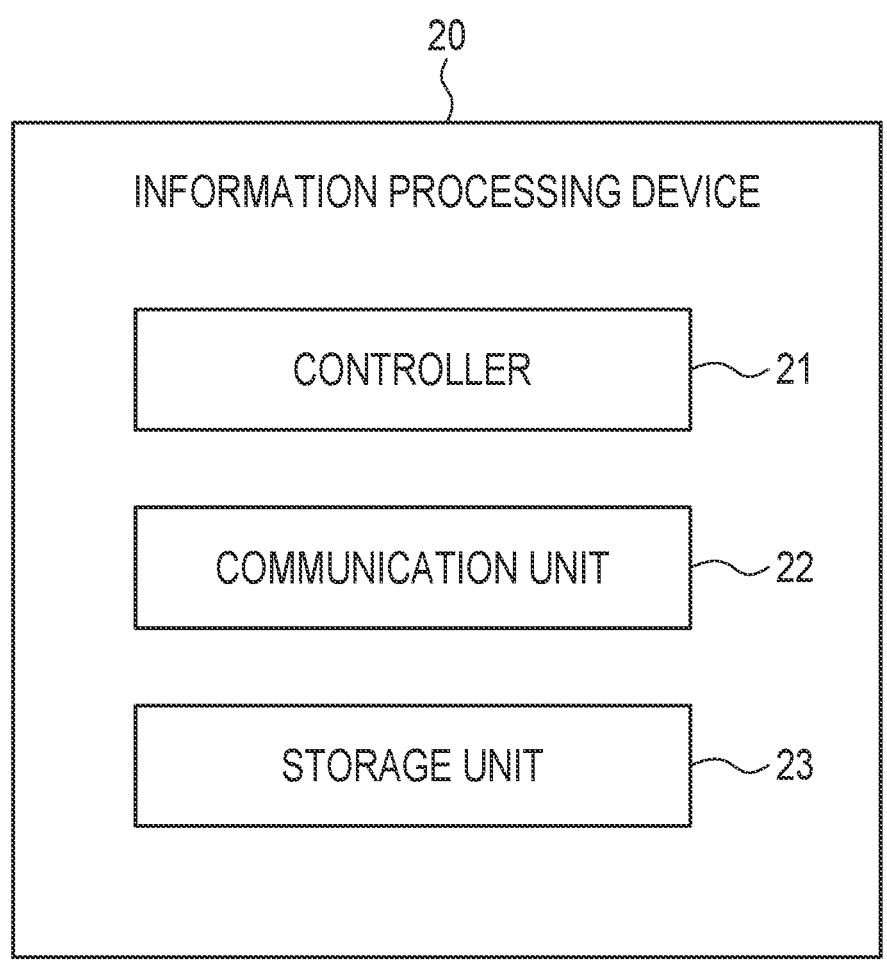
FIG. 2 is a block diagram showing a schematic configuration of an information processing device according to the embodiment of the present disclosure.

A configuration of the information processing device 20 according to the present embodiment will be described with reference to FIG. 2.

The information processing device 20 includes a controller 21, a communication unit 22 and a storage unit 23.

The controller 21 includes at least one processor, at least one programmable circuit, at least one dedicated circuit, or any combination thereof. The processor is a general-purpose processor, such as a central processing unit (CPU) or a graphics processing unit (GPU), or a dedicated processor specialized for specific processing. The programmable circuit is, for example, a field-programmable gate array (FPGA). The dedicated circuit is, for example, an application specific integrated circuit (ASIC). The controller 21 executes processing related to an operation of the information processing device 20 while controlling each unit of the information processing device 20.

The communication unit 22 includes at least one communication interface. The communication interface conforms to, for example, a mobile communication standard, a wired LAN standard, or a wireless LAN standard, but is not limited thereto, and may conform to any communication standard. The communication unit 22 receives data used for the operation of the information processing device 20 and transmits data obtained by the operation of the information processing device 20.

The storage unit 23 includes at least one semiconductor memory, at least one magnetic memory, at least one optical memory, or any combination thereof. The semiconductor memory is, for example, a random access memory (RAM) or a read only memory (ROM). The RAM is, for example, a static random access memory (SRAM) or a dynamic random access memory (DRAM). The ROM is, for example, an electrically erasable programmable read only memory (EEPROM). The storage unit 23 functions, for example, as a main storage device, an auxiliary storage device, or a cache memory. The storage unit 23 stores data used for the operation of the information processing device 20 and data obtained by the operation of the information processing device 20. In the present embodiment, the data used for the operation of the information processing device 20 includes a system program, an application program, a database, and the like.

Figure 3:
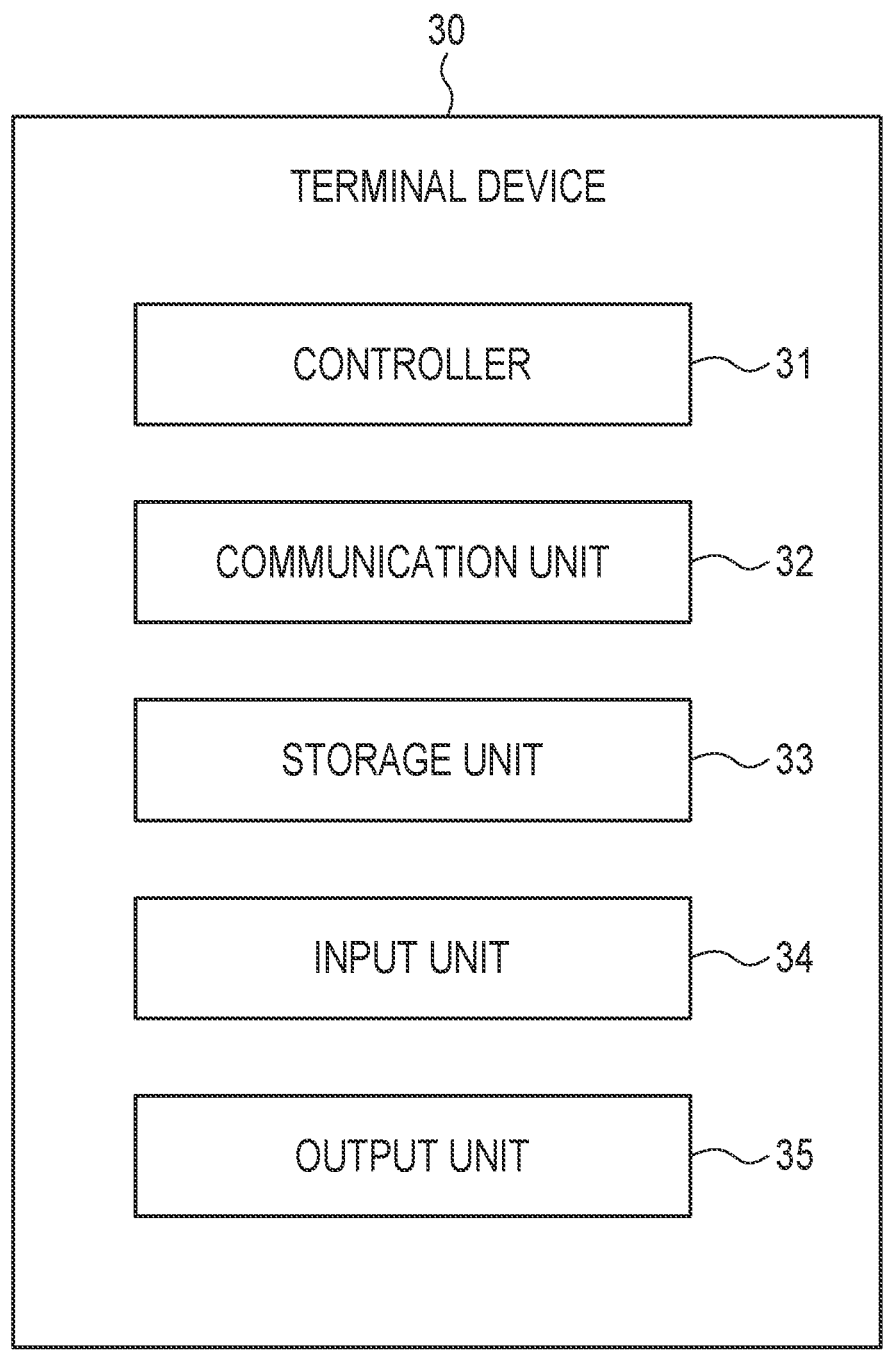
FIG. 3 is a block diagram showing a schematic configuration of a terminal device according to the embodiment of the present disclosure.

A configuration of the terminal device 30 according to the present embodiment will be described with reference to FIG. 3.

The terminal device 30 includes a controller 31, a communication unit 32, a storage unit 33, an input unit 34, and an output unit 35.

The controller 31 includes at least one processor, at least one programmable circuit, at least one dedicated circuit, or any combination thereof. The processor is a general- purpose processor, such as a CPU or GPU, or a dedicated processor specialized for specific processing. The programmable circuit is, for example, an FPGA. The dedicated circuit is, for example, an ASIC. The controller 31 executes processing related to an operation of the terminal device 30 while controlling each unit of the terminal device 30.

The communication unit 32 includes at least one communication interface. The communication interface is, for example, an interface conforming to a mobile communication standard, such as long term evolution (LTE), a 4th generation (4G) standard, or a 5th generation (5G) standard, an interface conforming to a short-range wireless communication standard, such as Bluetooth (registered trademark), or a LAN interface. The communication unit 32 receives data used for the operation of the terminal device 30 and transmits data obtained by the operation of the terminal device 30.

The storage unit 33 includes at least one semiconductor memory, at least one magnetic memory, at least one optical memory, or any combination thereof. The semiconductor memory is, for example, a RAM or a ROM. The RAM is, for example, a SRAM or a DRAM. The ROM is, for example, an EEPROM. The storage unit 33 functions, for example, as a main storage device, an auxiliary storage device, or a cache memory. The storage unit 33 stores data used for the operation of the terminal device 30 and data obtained by the operation of the terminal device 30.

The input unit 34 includes at least one input interface. The input interface is, for example, a physical key, a capacitive key, a pointing device, a touch screen integrated with a display, a camera, light detection and ranging or laser imaging, detection, and ranging (LiDAR), or a microphone. The input unit 34 receives an operation of inputting data used for the operation of the terminal device 30. The input unit 34 may be connected to the terminal device 30 as an external input device instead of being provided in the terminal device 30. As a connection interface, for example, an interface conforming to a standard, such as a universal serial bus (USB), HDMI (registered trademark), or Bluetooth (registered trademark), can be used.

The output unit 35 includes at least one output interface. The output interface is, for example, a display or speaker. The display is, for example, a liquid crystal display (LCD) or an organic electro luminescence (EL) display. The output unit 35 outputs data obtained by operating the terminal device 30. The output unit 35 may be connected to the terminal device 30 as an external output device instead of being provided in the terminal device 30. As a connection interface, for example, an interface conforming to a standard, such as a USB, HDMI (registered trademark), or Bluetooth (registered trademark), can be used.

Figure 4:
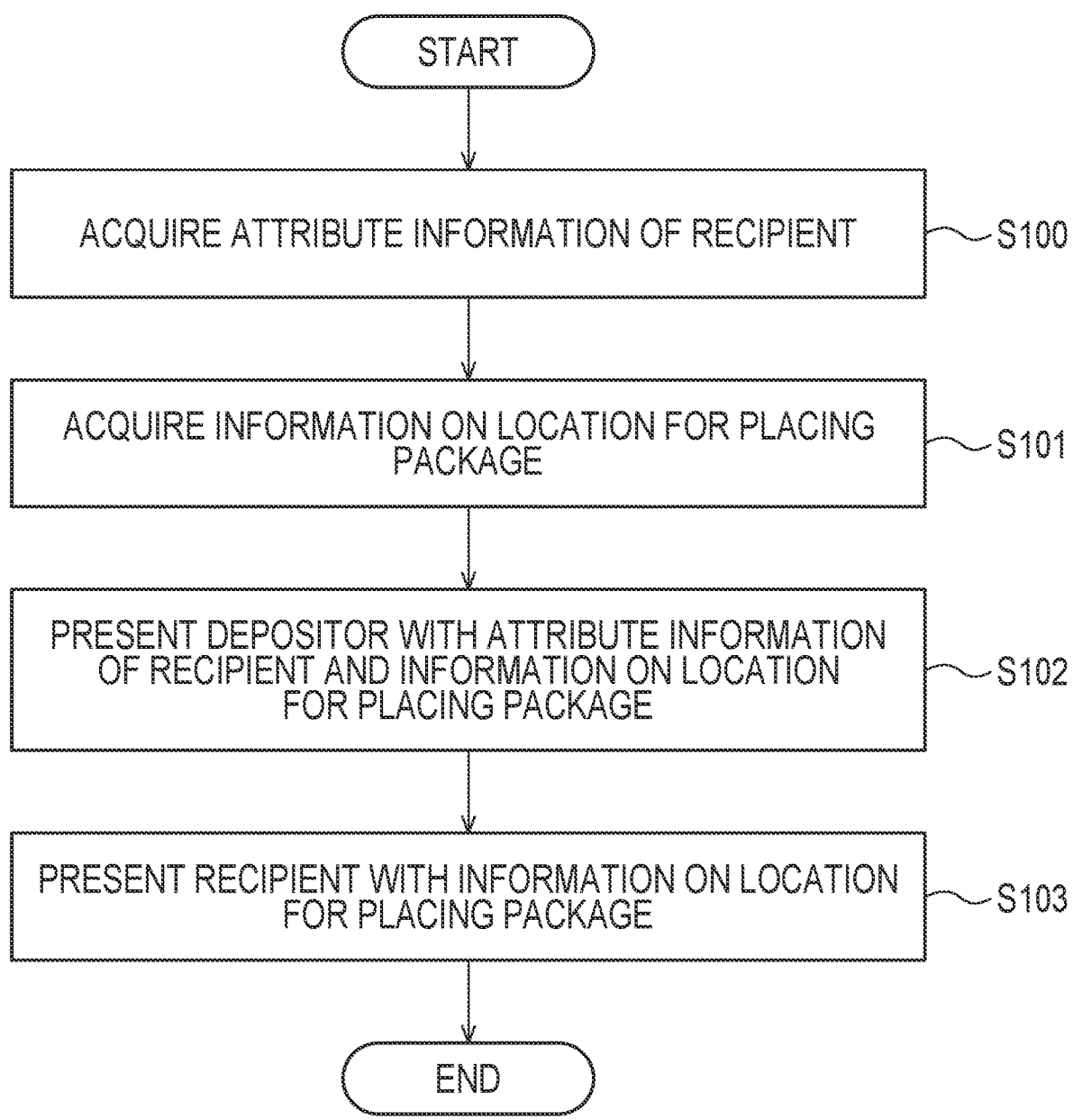
FIG. 4 is a flowchart showing an operation of the information processing device according to the embodiment of the present disclosure.

The operation of the information processing device 20 according to the present embodiment will be described with reference to FIG. 4. The operation is an example of a method according to the embodiment of the present disclosure.

In the present example, the vehicle 10 is capable of unmanned autonomous traveling (for example, autonomous driving at Level 5 as defined in SAE) and autonomously travels between production lines provided in a facility. In the present example, it is assumed that a depositor in charge of a first production line in the facility loads a package into the vehicle 10, and that a recipient in charge of a second production line in the facility unloads the package from the vehicle 10. In the present example, it is assumed that the package is a returnable box accommodating a part used in the facility. In the present example, each package is attached with a radio frequency (RF) tag or a QR code (registered trademark) in which information indicating identification information of the package is recorded in advance. The identification information of the package may include, for example, information indicating a type of the package, information indicating a delivery source and a delivery destination, and information (name, face information, or the like) indicating a depositor and a recipient, but is not limited thereto. In the present example, it is assumed that the storage unit 23 of the information processing device 20 stores in advance information indicating an attribute of the recipient of the package, and identification information (terminal ID or the like) of the terminal device 30 possessed by each of the depositor and the recipient of the package, the pieces of information being associated with the identification information of the package. However, the present disclosure is not limited to these examples.

Step S100: The controller 21 of the information processing device 20 acquires information indicating an attribute of a recipient of a package.

Specifically, the controller 21 of the information processing device 20 acquires, via the communication unit 22, identification information of a package to be loaded into the vehicle 10 by a depositor (hereinafter, also referred to as a "target package"), the identification information being acquired by reading an RF tag or a QR code (registered trademark) attached to the target package with an optional sensor provided, for example, around a loading port of the package of the vehicle 10. The controller 21 of the information processing device 20 acquires information indicating an attribute of a recipient of the target package associated with the identification information of the target package, by referring to the storage unit 23. Here, the information indicating the attribute of the recipient may include, for example, information indicating a height or an arm length of the recipient, but is not limited thereto.

Step S101: The controller 21 of the information processing device 20 acquires information indicating a location for placing the package in the vehicle 10.

Specifically, the controller 21 of the information processing device 20 decides a location for placing the target package in the vehicle 10 based on the information indicating the attribute of the recipient of the target package acquired in Step S100. More specifically, the controller 21 of the information processing device 20 decides a section for accommodating the target package among a plurality of sections for accommodating the packages provided in the vehicle 10 based on the information indicating the attribute of the recipient of the target package acquired in Step S100. For example, when the height or the arm length of the recipient is less than a predetermined threshold, the controller 21 of the information processing device 20 may decide to accommodate the target package in a section at a height position lower than the predetermined threshold. In addition, for example, when the height or the arm length of the recipient is equal to or greater than a predetermined threshold, the controller 21 of the information processing device 20 may decide to accommodate the target package in a section at a height position equal to or higher than the predetermined threshold. In this way, the controller 21 of the information processing device 20 can acquire information indicating the location for placing the target package.

In deciding the location for placing the target package, the controller 21 of the information processing device 20 may also consider information indicating a type of the target package acquired by reading an RF tag or a QR code (registered trademark) attached to the target package with an optional sensor provided around the loading port of the package of the vehicle 10. For example, the controller 21 of the information processing device 20 may decide to accommodate the target package in a section at a height position lower than a predetermined threshold when a weight of the target package is equal to or greater than a predetermined threshold based on the acquired information indicating the type of the target package.

Step S102: The controller 21 of the information processing device 20 presents the depositor of the package with the information indicating the location for placing the package acquired in Step S101 and the information indicating the attribute of the recipient acquired in Step S100.

Specifically, the controller 21 of the information processing device 20 specifies the terminal device 30 of the depositor by acquiring identification information of the terminal device 30 possessed by the depositor of the target package associated with the identification information of the target package acquired in Step S100 by referring to the storage unit 23. The controller 21 of the information processing device 20 transmits the information indicating the attribute of the recipient acquired in Step S100 and the information indicating the location for placing the target package acquired in Step S101 to the specified terminal device 30 via the communication unit 22. The controller 31 of the terminal device 30 receives the information indicating the attribute of the recipient and the information indicating the location for placing the target package from the information processing device 20 via the communication unit 32. The controller 31 of the terminal device outputs, via the output unit 35, the received information indicating the attribute of the recipient and the received information indicating the location for placing the target package to the depositor by a voice or an image. As described above, the attribute of the recipient of the target package is presented to the depositor of the target package together with the location for placing the target package in the vehicle 10. Therefore, the depositor of the target package can easily imagine the recipient of the target package, and can suppress the mistake of the location for placing the target package.

Here, when a digital signage capable of communicating with the information processing device 20 via the network 40 is provided outside the vehicle 10 (for example, around the loading port) or outside the returnable box, the controller 21 of the information processing device 20 may transmit the information indicating the location for placing the target package and the information indicating the attribute of the recipient to the digital signage via the communication unit 22. As a result, the digital signage can display the information indicating the location for placing the target package and the information indicating the attribute of the recipient to the depositor.

When the depositor places the target package at a mistaken position, an error message indicating that the target package is placed at the mistaken position and a correct location for placing the target package may be presented to the depositor. Specifically, the controller 21 of the information processing device 20 acquires image information including the depositor and the target package from an optional camera provided, for example, around the loading port of the package in the vehicle 10 via the communication unit 22. When the controller 21 of the information processing device 20 determines that the target package is placed at the mistaken position based on the acquired image information by using an optional image recognition technique, the controller 21 generates the error message. The controller 21 of the information processing device 20 transmits the generated error message to the terminal device 30 of the depositor or the digital signage via the communication unit 22. As a result, the terminal device 30 of the depositor or the digital signage can display the error message indicating that the target package is placed at the mistaken position and the correct location for placing the target package to the depositor. Instead of the error message, a warning sound, such as a buzzer for notifying that the target package is placed at the mistaken position, may be emitted.

In the present example, it is assumed that the vehicle 10 is moved from the first production line of which the depositor takes charge to the second production line of which the recipient takes charge by autonomously traveling while being mounted with the target package at a given time in cooperation with, for example, a velocity sensor, an acceleration sensor, an angular velocity sensor, light detection and ranging or laser imaging, detection, and ranging (LIDAR), or a steering angle sensor. The controller 21 of the information processing device 20 can determine whether or not the vehicle 10 has arrived at the second production line of which the recipient takes charge through communication with the vehicle 10 via the network 40. However, the present disclosure is not limited to these examples.

Step S103: The controller 21 of the information processing device 20 presents the recipient with the information indicating the location for placing the package.

Specifically, the controller 21 of the information processing device 20 specifies the terminal device 30 of the recipient by acquiring identification information of the terminal device 30 of the recipient associated with the identification information of the target package acquired in Step S100 by referring to the storage unit 23. The controller 21 of the information processing device 20 transmits the information indicating the location for placing the target package acquired in Step S101 to the specified terminal device 30 via the communication unit 22. The controller 31 of the terminal device 30 receives the information indicating the location for placing the target package from the information processing device 20 via the communication unit 32. The controller 31 of the terminal device 30 outputs, via the output unit 35, the received information indicating the location for placing the target package to the recipient by a voice or an image.

Here, when the above-described digital signage is provided outside the vehicle 10 (for example, around the loading port), the controller 21 of the information processing device 20 may transmit the information indicating the location for placing the target package to the digital signage via the communication unit 22. As a result, the digital signage can display the information indicating the location for placing the package to the recipient.

As described above, the controller 21 of the information processing device 20 according to the present embodiment acquires the information indicating the attribute of the recipient of the package. The controller 21 of the information processing device 20 acquires information indicating a location for placing the package in the vehicle 10. The controller 21 of the information processing device 20 presents the depositor of the package with the information indicating the location for placing the package and the information indicating the attribute of the recipient.

With the configuration as described above, the attribute of the recipient of the package is also presented to the depositor of the package. Therefore, the depositor can easily assume the recipient and can suppress the mistake of the location for placing the package. Therefore, a technique related to deliver of a package using the vehicle 10 is improved.

Although the present disclosure has been described with reference to the drawings and examples, it is to be noted that various modifications and variations may be made based on the present disclosure by those skilled in the art. Therefore, such modifications and variations are to be understood as included within the scope of the present disclosure. For example, functions and the like included in each component or each step may be rearranged in any logically consistent way, and a plurality of components or steps may be combined into one or divided.

As a modification example, an embodiment in which the configuration and the operation of the information processing device 20 are distributed to a plurality of computers that can communicate with each other is possible. For example, an embodiment in which some or all of the components of the information processing device 20 are provided in the vehicle 10 is possible.

In addition, as a modification example, an embodiment in which a general-purpose computer functions as the information processing device 20 or the terminal device according to the present embodiment is possible. Specifically, a program describing processing contents for realizing each function of the information processing device 20 or the terminal device 30 according to the present embodiment is stored in a memory of the general-purpose computer, and the program is read out and executed by a processor of the general-purpose computer. Therefore, the present disclosure can also be realized as a program that can be executed by a processor or a non-transitory computer-readable medium that stores the program.

What is claimed is:

1. An information processing device comprising a controller configured to:
   acquire information indicating an attribute of a recipient of a package;
   acquire automatically determine information indicating a location for placing the package in a vehicle based on the attribute of the recipient of the package;
   automatically transmit the information indicating the location for placing the package and the information indicating the attribute of the recipient to a terminal device of a depositor of the package; and
   automatically present the depositor of the package with the information indicating the location for placing the package and the information indicating the attribute of the recipient via an output unit of the terminal device of the depositor of the package;
   wherein the controller is configured to execute processing for performing the presentation by a voice or an image;
   wherein the controller acquires image information including the depositor and the target package from a camera located in a loading port of the vehicle, and if the target package is placed in a mistaken position, the controller automatically generates an error message indicating the package is placed in the mistaken position and a correct location for placing the package.

2. The information processing device according to claim 1, wherein the attribute of the recipient includes a height or an arm length of the recipient.

3. The information processing device according to claim 1, wherein the controller is configured to present the recipient with the information indicating the location for placing the package.

4. The information processing device according to claim 1, wherein the vehicle is configured to perform autonomous traveling.

5. The information processing device according to claim 4, wherein:
   the vehicle is configured to autonomously travel between production lines provided in a facility; and
   the package includes a returnable box accommodating a part used in the facility.

6. A method executed by an information processing device, the method comprising:
   acquiring information indicating an attribute of a recipient of a package;
   determining information indicating a location for placing the package in a vehicle based on the attribute information of the recipient of the package;
   transmitting the information indicating the location for placing the package and the information indicating the attribute of the recipient to a terminal device of a depositor of the Package; and
   presenting the depositor of the package with the information indicating the location for placing the package and the information indicating the attribute of the recipient via an output unit of the terminal device of a depositor of the package;
   wherein the output unit outputs the information indicating the location for placing the package and the information indicating the attribute of the recipient by a voice or an image;
   the method further comprising acquiring image information including the depositor and the target package from a camera located in a loading port of the vehicle, and if the target package is placed in a mistaken position, automatically generating an error message indicating the package is placed in the mistaken position and a correct location for placing the package.

7. The method according to claim 6, wherein the attribute of the recipient includes a height or an arm length of the recipient.

8. The method according to claim 6, further comprising presenting the recipient with the information indicating the location for placing the package.

9. The method according to claim 6, wherein the vehicle is configured to perform autonomous traveling.

10. The method according to claim 9, wherein:
    the vehicle is configured to autonomously travel between production lines provided in a facility; and
    the package includes a returnable box accommodating a part used in the facility.

11. A non-transitory storage medium storing instructions that are executable by a computer and that cause the computer to perform functions comprising:
    acquiring information indicating an attribute of a recipient of a package;
    determining information indicating a location for placing the package in a vehicle based on the attribute of the recipient of the package;
    transmitting the information indicating the location for placing the package and the information indicating the attribute of the recipient to a terminal device of the depositor of the package; and
    presenting the depositor of the package with the information indicating the location for placing the package and the information indicating the attribute of the recipient via an output unit of the terminal device of a depositor of the package;
    wherein the output unit outputs the information indicating the location for placing the package and the information indicating the attribute of the recipient by a voice or an image;
    wherein the stored instructions further cause the computer to perform functions comprising:
    acquiring image information including the depositor and the target package from a camera located in a loading port of the vehicle, and if the target package is placed in a mistaken position, generating an error message indicating the package is placed in the mistaken position and a correct location for placing the package.

12. The non-transitory storage medium according to claim 11, wherein the attribute of the recipient includes a height or an arm length of the recipient.

13. The non-transitory storage medium according to claim 11, wherein the functions further comprise presenting the recipient with the information indicating the location for placing the package.

14. The non-transitory storage medium according to claim 11, wherein the vehicle is configured to perform autonomous traveling.

* * * * *